(12) United States Patent
French et al.

(10) Patent No.: US 11,453,484 B2
(45) Date of Patent: Sep. 27, 2022

(54) HEAT SHIELD RETAINER AND METHOD

(71) Applicant: GOODRICH CORPORATION, Charlotte, NC (US)

(72) Inventors: Robert French, Beavercreek, OH (US); Keith Gorby, Huber Heights, OH (US); Jerry Miller, Kettering, OH (US)

(73) Assignee: Goodrich Corporation, Charlotte, NC (US)

( * ) Notice: Subject to any disclaimer, the term of this patent is extended or adjusted under 35 U.S.C. 154(b) by 818 days.

(21) Appl. No.: 16/222,330

(22) Filed: Dec. 17, 2018

(65) Prior Publication Data

US 2020/0189727 A1    Jun. 18, 2020

(51) Int. Cl.
| | | |
|---|---|---|
| *B64C 25/36* | (2006.01) | |
| *B60B 27/00* | (2006.01) | |
| *B64C 25/42* | (2006.01) | |
| *F16D 65/00* | (2006.01) | |
| *B60C 23/18* | (2006.01) | |

(52) U.S. Cl.
CPC .......... *B64C 25/36* (2013.01); *B60B 27/0047* (2013.01); *B64C 25/42* (2013.01); *F16D 65/0081* (2013.01); *B60B 2900/212* (2013.01); *B60C 23/18* (2013.01)

(58) Field of Classification Search
CPC ..... B64C 25/36; B64C 25/42; B60B 27/0047; B60B 2900/212; F16D 65/0081; B60C 23/18
See application file for complete search history.

(56) References Cited

U.S. PATENT DOCUMENTS

| | | | | |
|---|---|---|---|---|
| 1,601,180 | A | * | 9/1926 | Lindgren ................. B65D 7/32 220/684 |
| 4,017,123 | A | | 4/1977 | Horner et al. |
| 5,002,342 | A | | 3/1991 | Dyko |
| 5,248,013 | A | | 9/1993 | Ogue et al. |
| 5,301,826 | A | * | 4/1994 | Sandahl .................. F16B 5/004 220/4.03 |
| 5,310,025 | A | | 5/1994 | Anderson |
| 5,851,056 | A | * | 12/1998 | Hyde ..................... F16D 55/36 301/6.91 |
| 7,546,910 | B2 | | 6/2009 | Thorp et al. |
| 8,668,276 | B2 | | 3/2014 | Hall et al. |
| 9,021,812 | B2 | | 5/2015 | Pardington et al. |

(Continued)

FOREIGN PATENT DOCUMENTS

| | | |
|---|---|---|
| CN | 204415715 | 6/2015 |
| CN | 105324611 | 2/2016 |

(Continued)

OTHER PUBLICATIONS

European Patent Office, European Search Report dated Apr. 23, 2020 in Application No. 19217059.5.

*Primary Examiner* — Scott A Browne
(74) *Attorney, Agent, or Firm* — Snell & Wilmer L.L.P.

(57) ABSTRACT

A heat shield assembly is disclosed. In various embodiments, the heat shield assembly includes a first heat shield segment having a first end and a second end spaced from the first end, the first end including a first hook member and the second end including a second hook member; and a first heat shield retainer including a first clip member configured to engage the first hook member and a second clip member.

17 Claims, 9 Drawing Sheets

(56) References Cited

U.S. PATENT DOCUMENTS

| | | | |
|---|---|---|---|
| 10,094,234 B2 | 10/2018 | O'Leary et al. | |
| 2003/0102710 A1* | 6/2003 | Thorp | F16D 55/36 301/6.1 |
| 2010/0025172 A1* | 2/2010 | Campbell | F16D 65/12 188/264 G |
| 2016/0003161 A1 | 1/2016 | Grogg et al. | |
| 2016/0245518 A1 | 8/2016 | Drake | |
| 2018/0266439 A1 | 9/2018 | Thomas et al. | |
| 2021/0018055 A1* | 1/2021 | Miller | F16D 55/36 |

FOREIGN PATENT DOCUMENTS

| | | |
|---|---|---|
| CN | 106224021 | 12/2016 |
| CN | 106321170 | 7/2018 |
| EP | 1780057 | 5/2007 |
| EP | 3159571 | 4/2017 |
| JP | 06395914 | 9/2018 |
| MX | 2016011222 | 1/2017 |

* cited by examiner

HEAT SHIELD RETAINER AND METHOD

FIELD

The present disclosure relates generally to wheel and brake assemblies and, more particularly, to methods and apparatus used to retain in place heat shield liners used in aircraft wheel and brake assemblies.

BACKGROUND

Aircraft typically utilize brake systems on wheels to slow or stop the aircraft during landings, taxiing and rejected takeoffs. The brake systems generally employ a brake stack comprising a series of friction disks that may be forced into sliding contact with one another during brake actuation to slow or stop the aircraft. Under various conditions, brake actuation may generate high temperatures in the vicinity of the brake stack that can adversely impact or damage wheels or tires mounted thereon. A heat shield positioned between the brake stack and the wheel can mitigate thermal damage.

SUMMARY

A heat shield assembly is disclosed. In various embodiments, the heat shield assembly includes a first heat shield segment having a first end and a second end spaced from the first end, the first end including a first hook member and the second end including a second hook member; and a first heat shield retainer including a first clip member configured to engage the first hook member and a second clip member.

In various embodiments, the first hook member extends along at least a first portion of a length between an inboard end and an outboard end of the first heat shield segment. In various embodiments, the first clip member extends along at least the first portion of the length between the inboard end and the outboard end of the first heat shield segment. In various embodiments, the first hook member and the first clip member each comprise a U-shaped profile in a circumferential cross section.

In various embodiments, the second hook member extends along at least a second portion of the length between the inboard end and the outboard end of the first heat shield segment. In various embodiments, the second clip member extends along at least the second portion of the length between the inboard end and the outboard end of the first heat shield segment. In various embodiments, the second clip member is configured to engage the second hook member of the first heat shield segment. In various embodiments, the assembly further includes a second heat shield segment and the second clip member is configured to engage the second heat shield segment.

In various embodiments, the assembly includes a second heat shield retainer configured to engage the first end of the first heat shield segment. In various embodiments, the first heat shield retainer is configured for positioning radially inward of the second heat shield retainer. In various embodiments, the first heat shield retainer is configured for positioning proximate a radially inner surface of the first heat shield segment and the second heat shield retainer is configured for positioning proximate a radially outer surface of the first heat shield segment. In various embodiments, the second heat shield retainer is configured to engage the second end of the first heat shield segment. In various embodiments, the assembly includes a second heat shield segment and the second heat shield retainer is configured to engage the second heat shield segment.

A wheel assembly is disclosed. In various embodiments, the wheel assembly includes, a wheel having a wheel well and configured to rotate about an axis; a brake mechanism disposed radially inward of the wheel well; a heat shield segment having a first end and a second end spaced from the first end, the first end including a first hook member and the second end including a second hook member; and a heat shield retainer including a first clip member configured to engage the first hook member and a second clip member.

In various embodiments, the first hook member extends along a length between an inboard end and an outboard end of the heat shield segment. In various embodiments, the first clip member extends along the length between the inboard end and the outboard end of the heat shield segment. In various embodiments, the second clip member is configured to engage the second hook member of the heat shield segment. In various embodiments, the heat shield retainer includes a tab member configured for engagement with the wheel.

A method for assembling a heat shield assembly is disclosed. In various embodiments, the method includes the steps of positioning a heat shield segment first end adjacent a heat shield segment second end, the heat shield segment first end including a first hook member and the heat shield segment second end including a second hook member; and sliding a heat shield retainer, including a first clip member configured to engage the first hook member and a second clip member configured to engage the second hook member, along a length of the first hook member and the second hook member to engage the first hook member with the first clip member and the second hook member with the second clip member. In various embodiments, the heat shield assembly comprises either a single-segment heat shield or a multi-segment heat shield.

BRIEF DESCRIPTION OF THE DRAWINGS

The accompanying drawings illustrate various embodiments employing the principles described herein and are a part of the specification. The illustrated embodiments are meant for description and not to limit the scope of the claims.

DETAILED DESCRIPTION

The detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full, and/or any other possible attachment option. Additionally, any reference to without contact (or similar phrases) may also include reduced contact or minimal contact.

As used herein, a first component that is "radially outward" of a second component means that the first component is positioned at a greater distance away from a common axis than the second component. A first component that is "radially inward" of a second component means that the first component is positioned closer to the common axis than the second component. In the case of components that rotate circumferentially about a common axis, a first component that is radially inward of a second component rotates through a circumferentially shorter path than the second component. As used herein, "distal" refers to the direction outward, or generally, away from a reference component. As used herein, "proximal" and/or "proximate" refer to a direction inward, or generally, towards the reference component. All ranges may include the upper and lower values, and all ranges and ratio limits disclosed herein may be combined. Unless specifically stated otherwise, reference to "a," "an" or "the" may include one or more than one and reference to an item in the singular may also include the item in the plural.

Figure 1A:
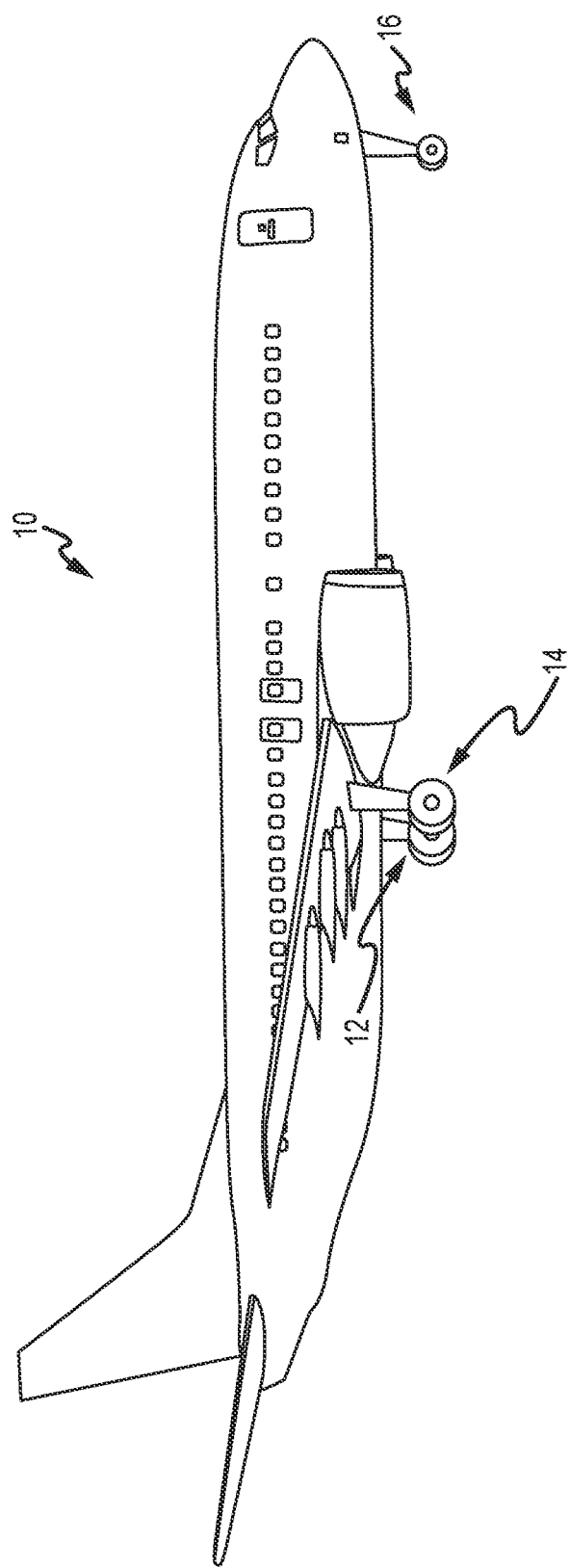
FIG. 1A illustrates an exemplary aircraft having a brake system, in accordance with various embodiments.

Referring to FIG. 1A, in accordance with various embodiments, an aircraft 10 is illustrated. The aircraft 10 includes landing gear, which may include a left main landing gear 12, a right main landing gear 14 and a nose landing gear 16. The landing gear support the aircraft 10 when it is not flying, allowing the aircraft 10 to taxi, take off and land without damage. While the disclosure refers to the three landing gear configurations just referred, the disclosure nevertheless contemplates any number of landing gear configurations.

Figure 1B:
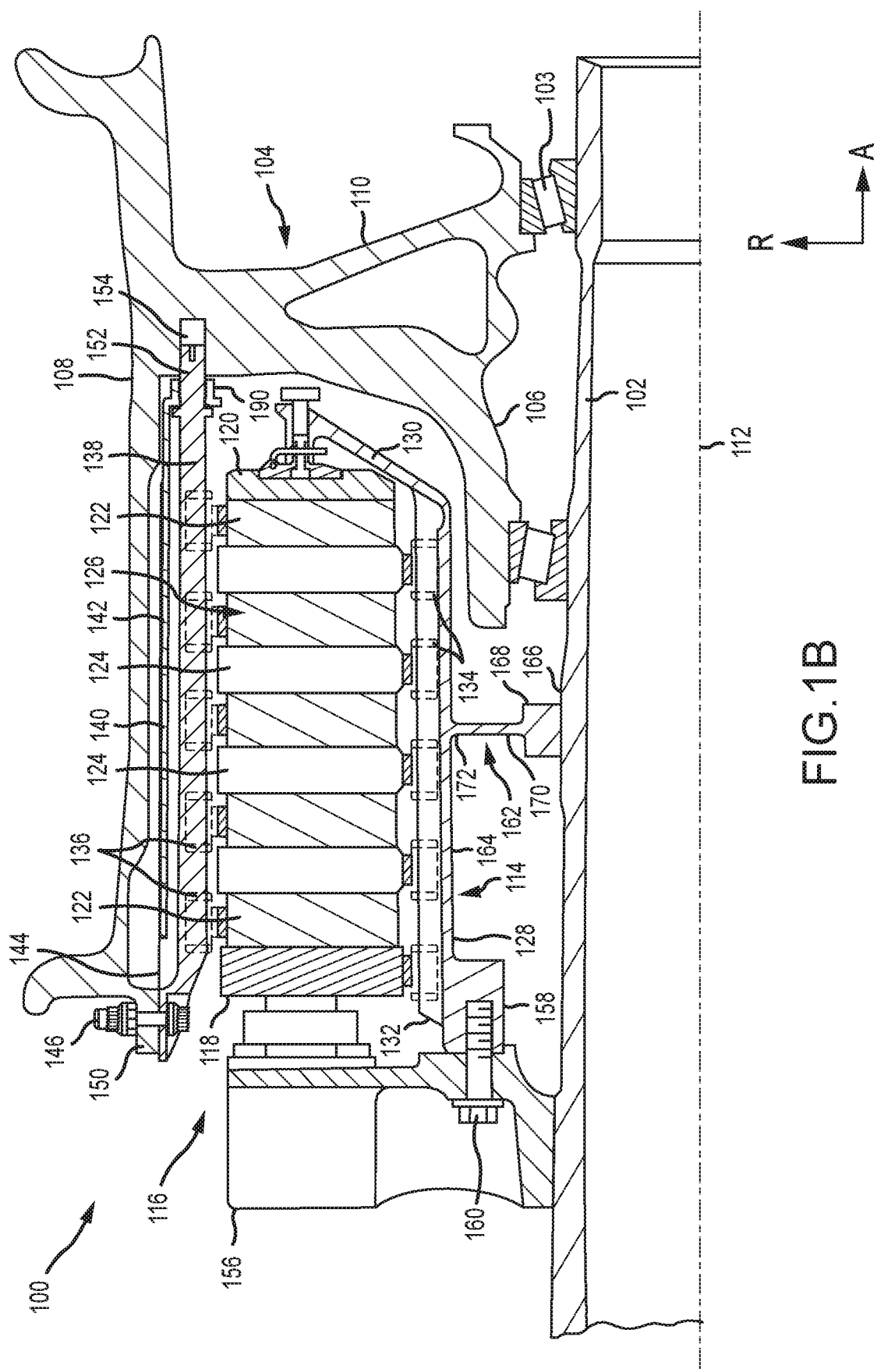
FIG. 1B illustrates a cross-sectional view of a brake assembly, in accordance with various embodiments.

Referring now to FIG. 1B, there is schematically depicted a brake mechanism 100 mounted on an axle 102 for use with a wheel 104 disposed on and configured to rotate about the axle 102 via one or more bearing assemblies 103. The wheel 104 includes a hub 106, a wheel well 108 concentric about the hub 106 and a web portion 110 interconnecting the hub 106 and the wheel well 108. A central axis 112 extends through the axle 102 and defines a center of rotation of the wheel 104. A torque plate barrel 114 (sometimes referred to as a torque tube or barrel or a torque plate or back leg) is aligned concentrically with the hub 106, and the wheel 104 is rotatable relative to the torque plate barrel 114.

The brake mechanism 100 includes a piston assembly 116, a pressure plate 118 disposed adjacent the piston assembly 116, an end plate 120 positioned a distal location from the piston assembly 116, and a plurality of rotor disks 122 interleaved with a plurality of stator disks 124 positioned intermediate the pressure plate 118 and the end plate 120. The pressure plate 118, the plurality of rotor disks 122, the plurality of stator disks 124 and the end plate 120 together form a brake heat sink or brake stack 126. The pressure plate 118, the end plate 120 and the plurality of stator disks 124 are mounted to the torque plate barrel 114 and remain rotationally stationary relative to the axle 102.

The torque plate barrel 114 may include an annular barrel or torque tube 128 and an annular plate or back leg 130. The back leg 130 is disposed at an end distal from the piston assembly 116 and may be made monolithic with the torque tube 128, as illustrated in FIG. 1B, or may be made as a separate annular piece and suitably connected to the torque tube 128. The torque tube 128 has a plurality of circumferentially spaced and axially extending splines 132 disposed on an outer surface of the torque tube 128. The plurality of stator disks 124 and the pressure plate 118 include notches or stator slots 134 on an inner periphery of the disks and the plate for engagement with the splines 132, such that each disk and the plate are axially slidable with respect to the torque tube 128.

The end plate 120 is suitably connected to the back leg 130 of the torque plate barrel 114 and is held non-rotatable, together with the plurality of stator disks 124 and the pressure plate 118, during a braking action. The plurality of rotor disks 122, interleaved between the pressure plate 118, the end plate 120 and the plurality of stator disks 124, each have a plurality of circumferentially spaced notches or rotor lugs 136 along an outer periphery of each disk for engagement with a plurality of torque bars 138 that is secured to or made monolithic with an inner periphery of the wheel 104.

An actuating mechanism for the brake mechanism 100 includes a plurality of piston assemblies, including the piston assembly 116, circumferentially spaced around an annular piston housing 156 (only one piston assembly is illustrated in FIG. 1B). Upon actuation, the plurality of piston assemblies affect a braking action by urging the pressure plate 118 and the plurality of stator disks 124 into frictional engagement with the plurality of rotor disks 122 and against the end plate 120. Fluid or hydraulic pressure, mechanical springs or electric actuators, among other mechanisms, may be used to actuate the plurality of piston assemblies. Through compression of the plurality of rotor disks 122 and the plurality of stator disks 124 between the pressure plate 118 and the end plate 120, the resulting frictional contact slows or stops or otherwise prevents rotation of the wheel 104. The plurality of rotor disks 122 and the plurality of stator disks 124 are fabricated from various materials, such as ceramic matrix composites, that enable the brake disks to withstand and dissipate the heat generated during and following a braking action.

The torque plate barrel 114 is secured to a stationary portion of the landing gear such as the axle 102, preventing the torque plate barrel 114 and the plurality of stator disks 124 from rotating during braking of the aircraft. The torque tube 128 portion of the torque plate barrel 114 may be attached to the annular piston housing 156 via an annular mounting surface 158, wherein bolt fasteners 160 secure the torque plate barrel 114 to the annular piston housing 156. A spacer member or pedestal 162 is positioned between an inner diameter surface 164 of the torque tube 128 and an outer diameter surface 166 of the axle 102. The pedestal 162 includes a radially inner surface or foot 168 for engaging the axle 102, a web portion 170 radially outward of the foot 168 and a head portion 172 for engaging the inner diameter surface 164 of the torque tube 128. The pedestal 162 augments support of the torque plate barrel 114 within the brake mechanism 100 generally and, more particularly, against the axle 102. The pedestal 162 may be made monolithic with the torque tube 128 portion of the torque plate barrel 114.

A heat shield 140 is secured directly or indirectly to the wheel 104 between a radially inward surface of the wheel well 108 and the plurality of torque bars 138. As illustrated in FIG. 1B, the heat shield 140 is concentric with the wheel well 108 and may have a plurality of heat shield sections 142 disposed between respective, adjacent pairs of the plurality of torque bars 138. The heat shield 140, or heat shield sections 142, is spaced from the radially inward surface of the wheel well 108 and secured in place by heat shield tabs 190, such that the heat shield 140, or heat shield sections 142, is disposed generally parallel to the axis of rotation or central axis 112 of the wheel 104 and intermediate the plurality of torque bars 138 and the radially inward surface of the wheel well 108. In various embodiments, including for heavy-duty applications, the heat shield 140, or heat shield sections 142, may be further secured in place by heat shield carriers 144.

The plurality of torque bars 138 is attached at axially inboard ends to the wheel 104 by torque bar bolts 146. The torque bar bolts 146 extend through respective holes in a flange 150 provided on the wheel 104 as shown, which flange 150 for purposes of the present description is intended to be considered as part of the wheel well 108. Each of the plurality of torque bars 138 may include a pin 152 or similar member at its axially outboard end (i.e., the end opposite the torque bar bolts 146) that is received within a hole 154 disposed proximate the web portion 110 of the wheel 104. The heat shield 140, or heat shield sections 142, is positioned adjacent a radially inward surface of the wheel well 108 and secured in place by the heat shield tabs 190.

Figure 2:
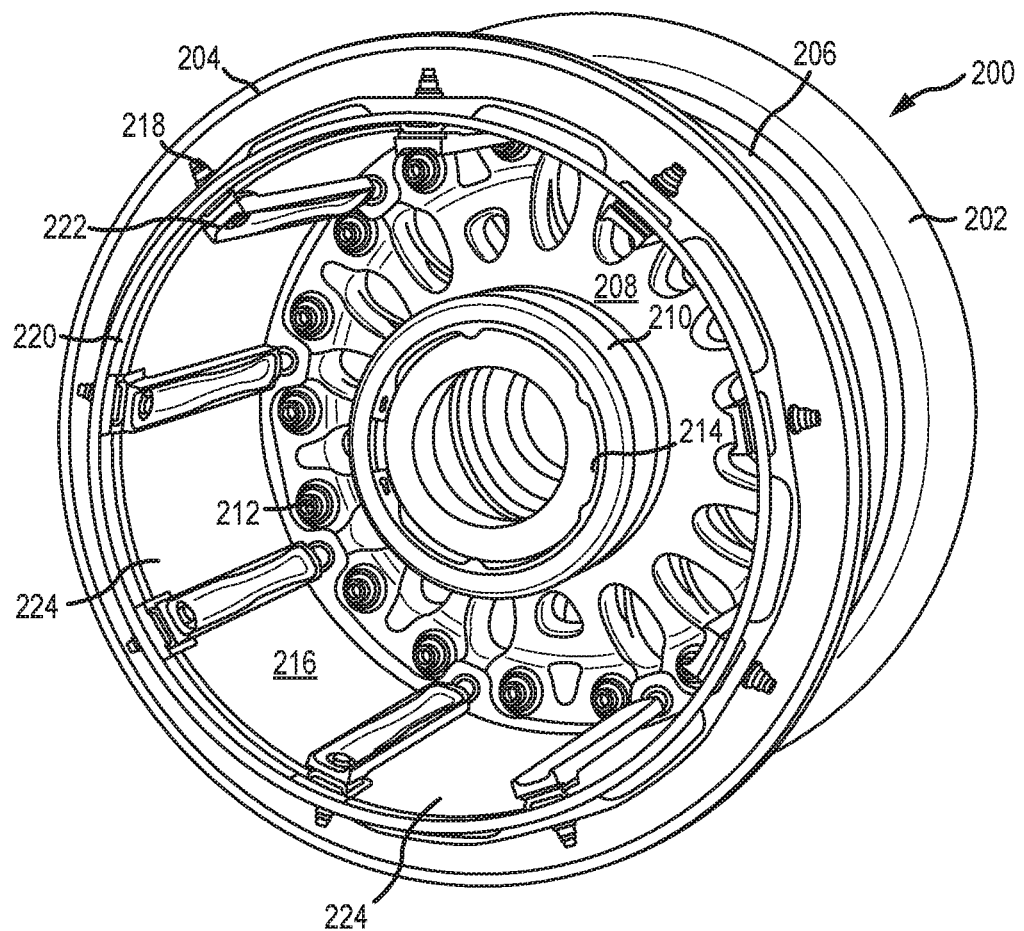
FIG. 2 illustrates a wheel having a heat shield, in accordance with various embodiments.

Referring now to FIG. 2, a wheel 200 having a segmented heat shield is provided. In various embodiments, the wheel 200 includes an outboard lip 202, coupled to a wheel disk 208 by a plurality of wheel tie bolts 212, and an inboard lip 204 defining a rim 206 about the wheel disk 208. A hub 210 is centered through the wheel disk 208 and may comprise one or more bearings 214. The rim 206 extends axially with respect to the hub 210 about a circumference of the wheel disk 208. A segmented heat shield 216 is disposed radially inward of the rim 206 between the inboard lip 204 and the wheel disk 208 of the wheel 200. In various embodiments, the segmented heat shield 216 includes a cylindrical structure extending circumferentially about an axis of the hub 210 and around an inner diameter of the rim 206. In various embodiments, the segmented heat shield 216 may be coupled proximate the rim 206 by a plurality of fasteners 218 and may be held proximate the rim 206, with a chin ring 220 proximate the inboard lip 204, by an interference between the segmented heat shield 216 and a plurality of torque bars 222. In various embodiments, the plurality of torque bars 222 may be coupled to the wheel disk 208 at an outboard end and may be coupled to the segmented heat shield 216 at an inboard end proximate the chin ring 220 by the plurality of fasteners 218. As described below, in various embodiments, the segmented heat shield 216 comprises a plurality of heat shield segments 224 that are arranged and assembled circumferentially proximate the inner diameter of the wheel 200.

Figure 3A:
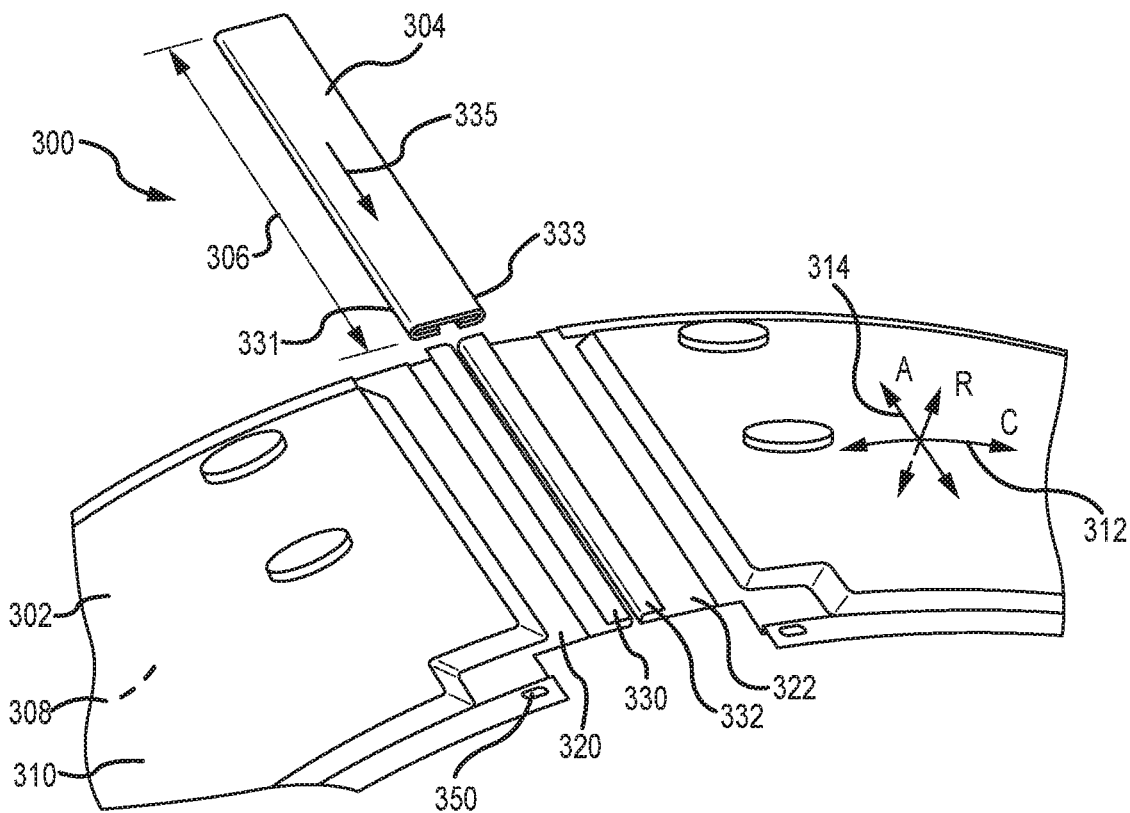
FIGS. 3A and 3B illustrate a heat shield segment and retainer, in accordance with various embodiments.
Figure 3B:
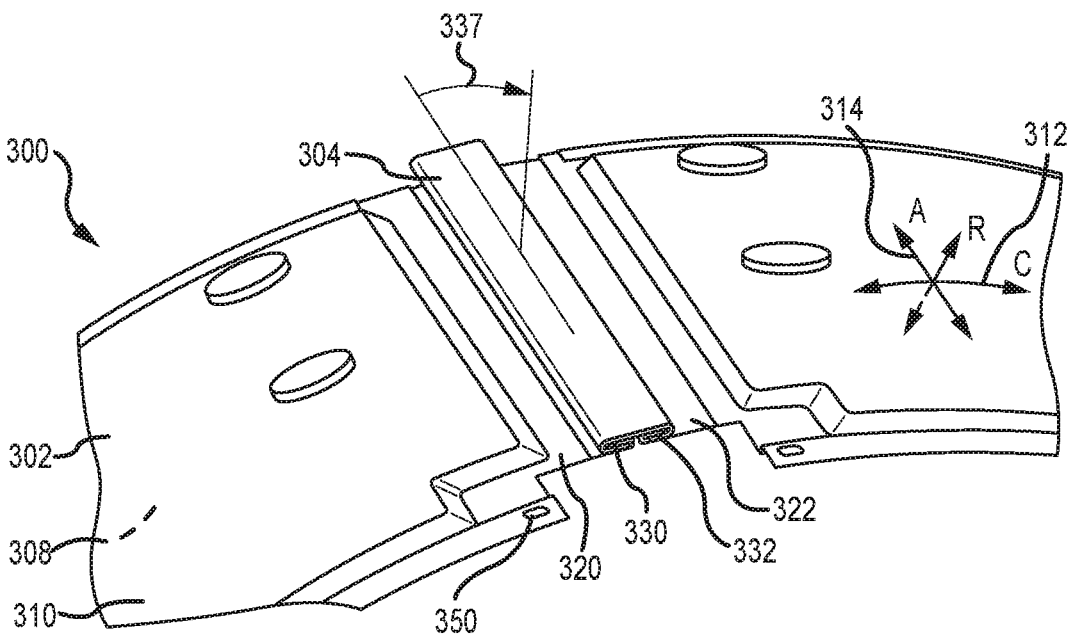

Referring now to FIGS. 3A and 3B, a heat shield assembly 300 is illustrated, in accordance with various embodiments. The heat shield assembly 300 includes a heat shield segment 302 and a heat shield retainer 304. In various embodiments, the heat shield retainer 304 assumes the form of a C-clip in cross section having a length 306 in an axial direction A. In various embodiments, the heat shield segment 302 defines an inner surface 308 (or first surface) and an outer surface 310 (or second surface) with respect to a radial direction R. In various embodiments, the heat shield segment 302 extends a circumferential distance 312 and an axial distance 314, respectively, in both a circumferential direction C and the axial direction A. In various embodiments, the axial distance 314 of the heat shield segment 302 may equal the distance between a first axial location (or inboard end) proximate an inboard lip and a second axial location (or outboard end) proximate a wheel disk of a wheel, such as, for example, the inboard lip 204 and the wheel disk 208 of the wheel 200 described above with reference to FIG. 2.

In various embodiments, the circumferential distance 312 may span the entire circumference of an inner surface of a wheel, to form a single-segment heat shield, or may span a fraction of the entire circumference, to form a multiple-segment heat shield (e.g., a heat shield assembly including a first heat shield segment and a second heat shield segment and a first heat shield retainer and a second heat shield retainer). In various embodiments, for example, the circumferential distance 312 may equal the distance between adjacent pairs of a plurality of torque bars, thereby forming a multiple-segment heat shield, where the number of heat shield segments equals the number of torque bars. In various embodiments, the number of heat shield segments forming a multiple-segment heat shield may be an integral number, regardless of the number of torque bars.

Still referring to FIGS. 3A and 3B, the heat shield segment 302 includes a first end 320 (or first circumferential end) and a second end 322 (or second circumferential end). In various embodiments, the first end 320 includes a first hook member 330 and the second end 322 includes a second hook member 332. The first hook member 330 is configured to engage a first clip member 331 of the heat shield retainer 304 and the second hook member 332 is configured to engage a second clip member 333 of the heat shield retainer 304. While the first hook member 330 and the second hook member 332, and the first clip member 331 and the second clip member 333, respectively, are each illustrated as having a curved U-shape profile in cross section (corresponding to the C-clip shape of the heat shield retainer 304 illustrated in FIGS. 3A and 3B), the disclosure contemplates other shapes or profiles, such as, for example, square- or V-shaped cross sectional shapes or profiles. Additionally, in various embodiments, the heat shield segment 302 includes a mount aperture 350 (or several such apertures) that is configured to secure the heat shield to the wheel using, for example, a screw or bolt or the like extending through the mount aperture 350 and into the wheel.

In various embodiments, the heat shield assembly 300 is assembled by positioning the first end 320 and the second end 322 of the heat shield segment 302 adjacent one another, as illustrated in FIG. 3A, and then sliding the heat shield retainer 304 in a direction 335 parallel to the axial direction A, such that the first clip member 331 and the second clip member 333 engage, respectively, the first hook member 330 and the second hook member 332 of the heat shield retainer 304. While the heat shield retainer 304, the first clip member 331 and the second clip member 333, and the first hook member 330 and the second hook member 332, are each illustrated as extending in a direction substantially parallel with the axial direction A, the disclosure contemplates each of the foregoing components may be configured to extend along directions other than parallel to the axial direction A. In various embodiments, for example, each of the foregoing components may be configured to extend at an angle 337 with respect to the axial direction A without loss of generality. In addition, while the first clip member 331 and the second clip member 333, and the first hook member 330 and the second hook member 332, are each illustrated extending substantially along the entire length of the heat shield segment 302 and the heat shield retainer 304, the disclosure contemplates embodiments where the various components extend along only a portion or a plurality of portions of the respective lengths.

Figure 4A:
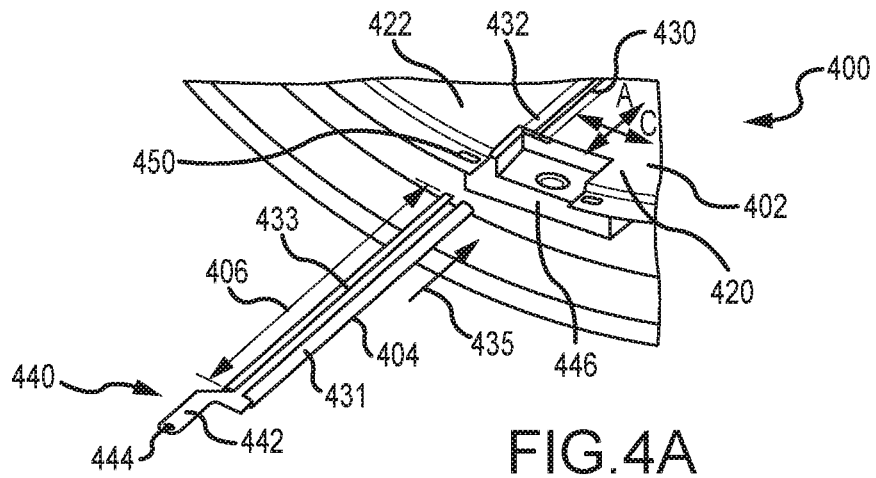
FIGS. 4A, 4B and 4C illustrate a heat shield segment and retainer, in accordance with various embodiments.
Figure 4B:
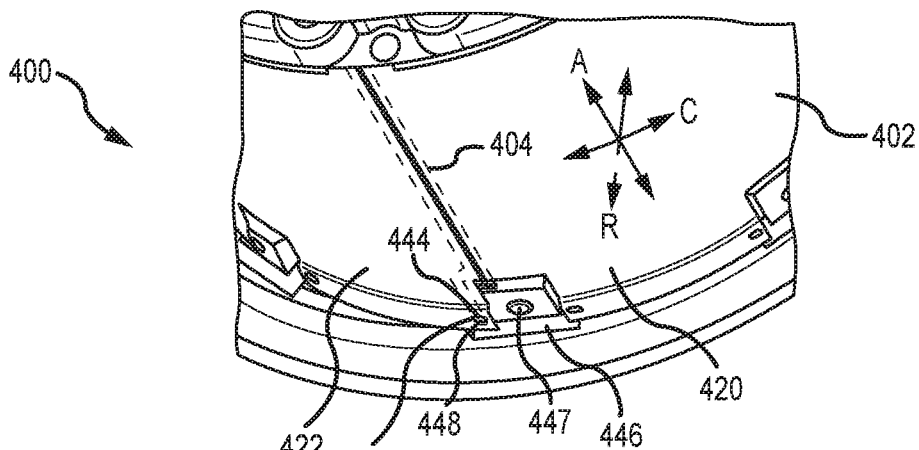
Figure 4C:
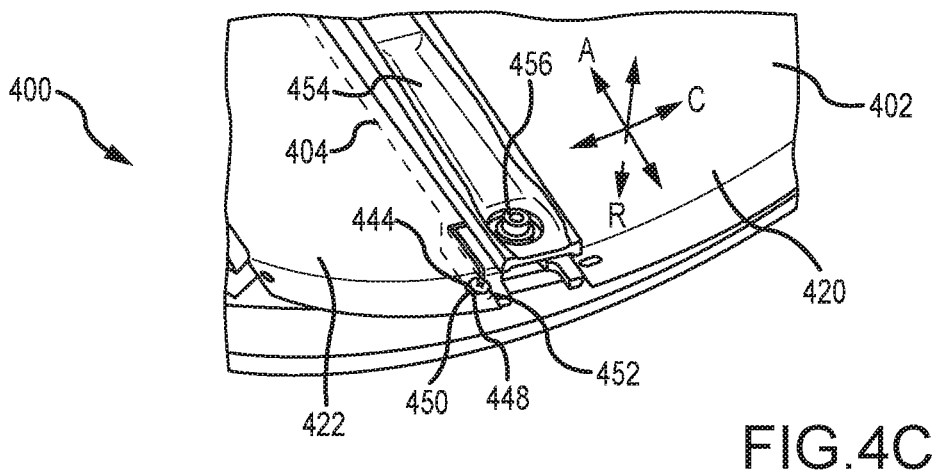

Referring now to FIGS. 4A, 4B and 4C, a heat shield assembly 400 is illustrated, in accordance with various embodiments. The heat shield assembly 400 includes a heat shield segment 402 and a heat shield retainer 404. In various embodiments, the heat shield retainer 404 assumes the form of a C-clip in cross section having a length 406 in an axial direction A. The heat shield segment 402 includes a first end 420 and a second end 422. In various embodiments, the first end 420 includes a first hook member 430 and the second end 422 includes a second hook member 432. The first hook member 430 is configured to engage a first clip member 431 of the heat shield retainer 404 and the second hook member 432 is configured to engage a second clip member 433 of the heat shield retainer 404. As illustrated, the heat shield retainer 404 may also include a retainer extension 440 in the form of a tab member 442 having a tab aperture 444 that extends through the tab member 442. As described below, the retainer extension 440 may function to secure the heat shield retainer 404 to a wheel, such as, for example, the wheel 200 described above with reference to FIG. 2.

In various embodiments, the heat shield assembly 400 is assembled by positioning the first end 420 and the second end 422 of the heat shield segment 402 adjacent one another, as illustrated in FIG. 4A, and then sliding the heat shield retainer 404 in a direction 435 parallel to the axial direction A, such that the first clip member 431 and the second clip member 433 engage, respectively, the first hook member 430 and the second hook member 432 of the heat shield retainer 404. As illustrated in FIG. 4B, once the heat shield retainer 404 is fully slid into position, the tab member 442 is positioned over a support block 446, configured for mounting to the wheel an inboard end of a torque bar 454, such as, for example, one of the plurality of torque bars 222 described above with reference to FIG. 2. In various embodiments, the support block 446 includes a main aperture 447 sized to receive a fastener 456 (e.g., one of the plurality of fasteners 218) configured to secure the torque bar 454 to the inboard end of the wheel. The support block 446 may also include a side aperture 448 (e.g., a threaded hole) that may be aligned with the tab aperture 444 extending through the tab member 442 and a mount aperture 450 (e.g., the mount aperture 350 described above with reference to FIG. 3) extending through the heat shield segment 402. In various embodiments, a threaded connector 452, such as, for example, a screw or a bolt, extends through both the tab aperture 444 and the mount aperture 450 and is threaded into the side aperture 448 to lock both the heat shield segment 402 and the heat shield retainer 404 in place. As illustrated, the torque bar 454 may then be mounted to the wheel using the fastener 456.

Figure 5A:
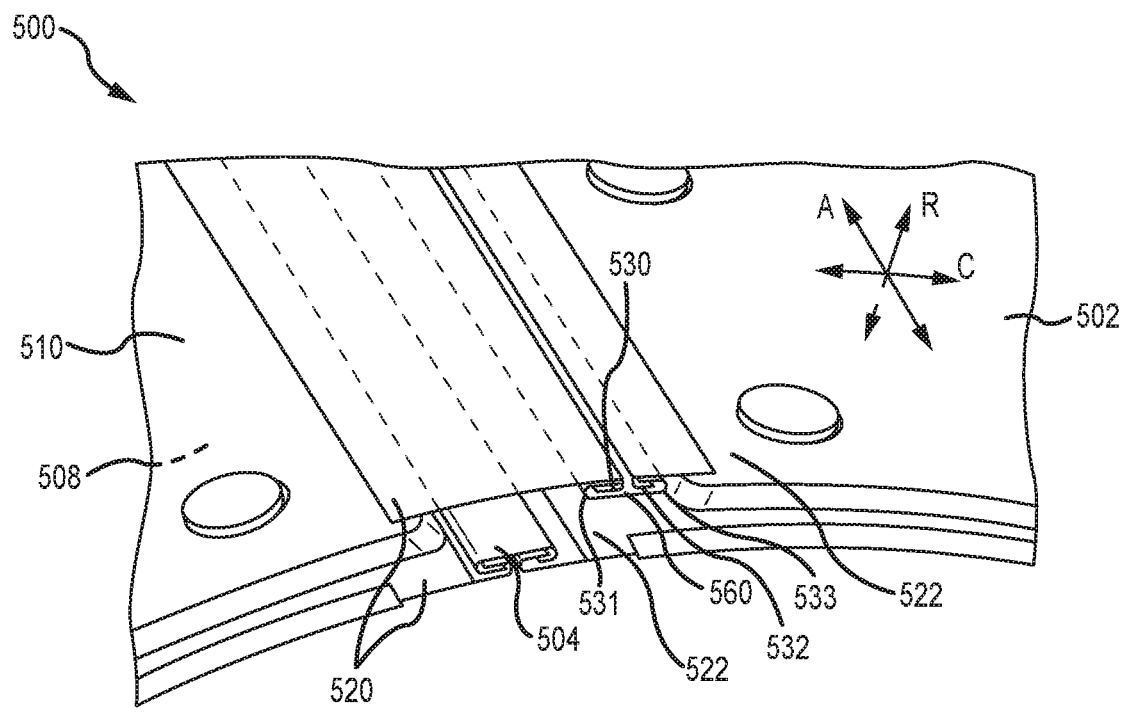
FIGS. 5A and 5B illustrate a heat shield segment and retainer, in accordance with various embodiments.
Figure 5B:
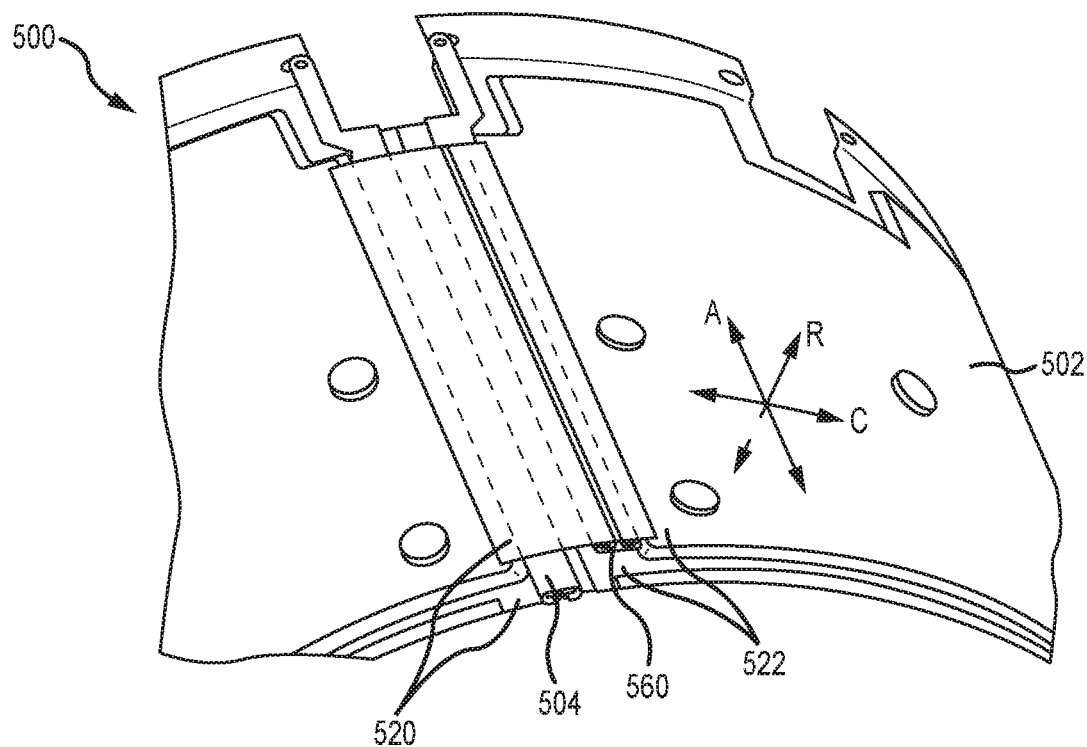

Referring now to FIGS. 5A and 5B, a heat shield assembly 500 is illustrated, in accordance with various embodiments. The heat shield assembly 500 includes a heat shield segment 502 and a first heat shield retainer 504. The structural and dimensional characteristics of the heat shield segment 502 and the first heat shield retainer 504 are similar to like-named and numbered components described above with reference to FIGS. 3A-3B and FIGS. 4A-4C, and so are not repeated here. In various embodiments, the heat shield assembly 500 further includes a second heat shield retainer 560. The second heat shield retainer 560, which is also similar to the heat shield retainer 304 described above with reference to FIGS. 3A and 3B, includes a first clip member 531 and a second clip member 533 configured to engage a first hook member 530 and a second hook member 532, respectively. In various embodiments, the first hook member 530 is part of a first end 520 of the heat shield segment 502 and the second hook member 532 is part of a second end 522 of the heat shield segment 502. In various embodiments, the first heat shield retainer 504 and the second heat shield retainer 560 are identical in all structural respects (or at least mirror images thereof), the main difference being the first heat shield retainer 504 is disposed on or proximate an inner surface 508 (or first surface) of the heat shield segment 502 and the second heat shield retainer 560 is disposed on or proximate an outer surface 510 (or second surface) of the heat shield segment 502 with respect to a radial direction R. The heat shield assembly 500 is assembled in much the same fashion as described above, with the exception that two heat shield retainers are installed, rather than just one.

Figure 6A:
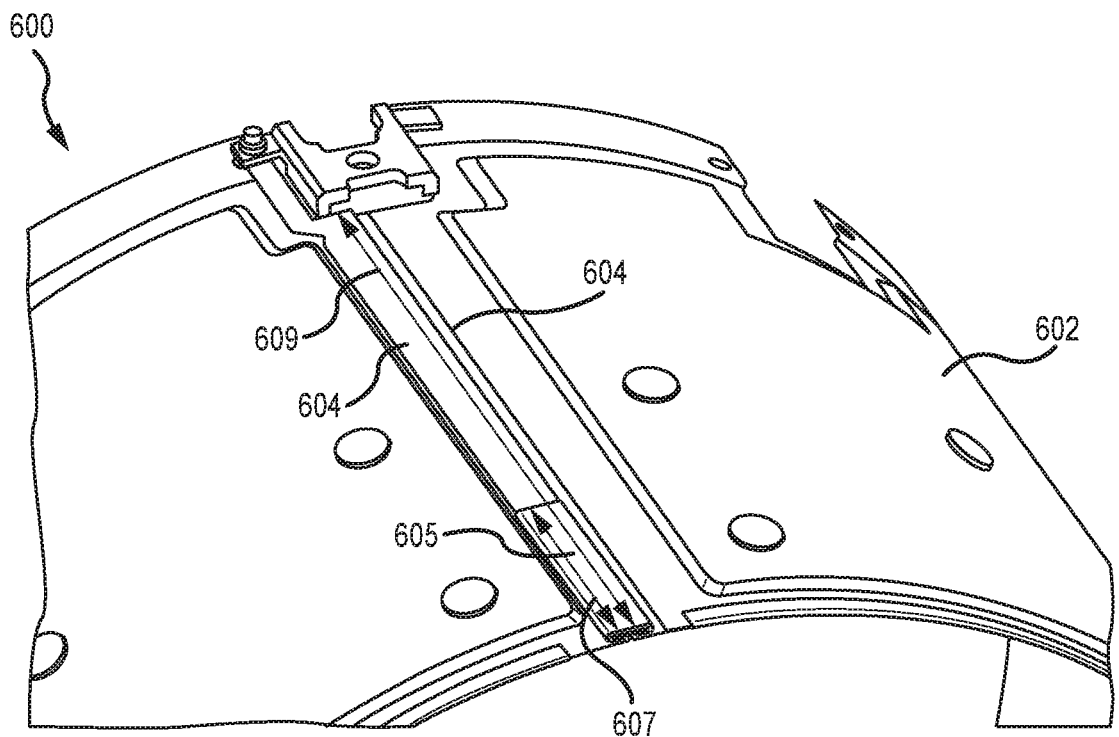
FIGS. 6A and 6B illustrate a heat shield segment and retainer, in accordance with various embodiments.
Figure 6B:
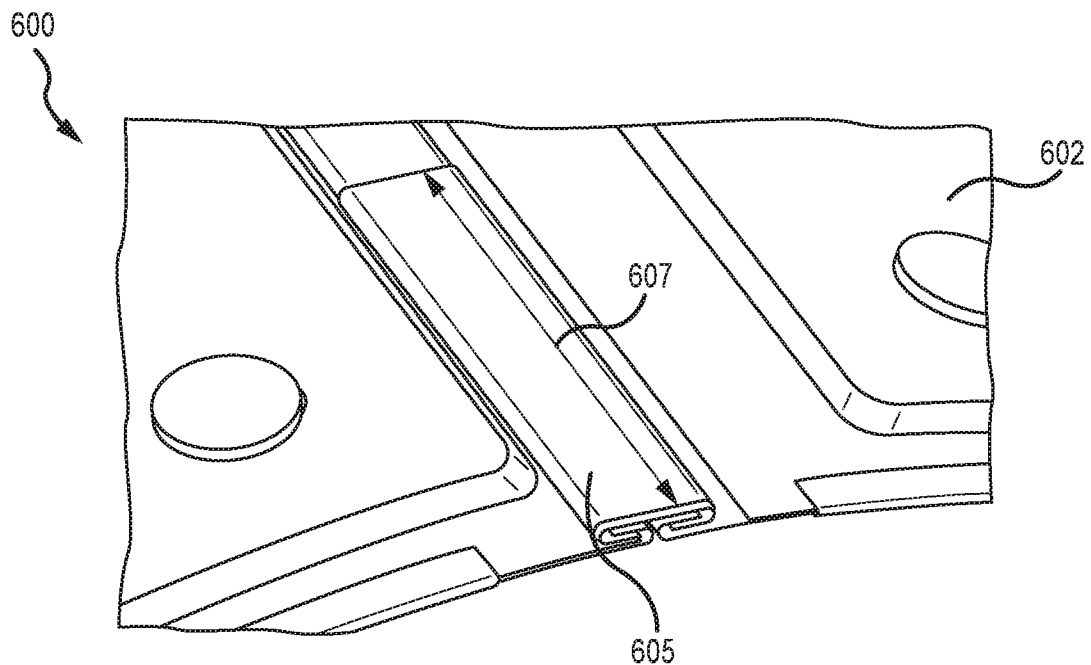

Referring now to FIGS. 6A and 6B, a heat shield assembly 600 is illustrated, in accordance with various embodiments. The heat shield assembly 600 includes a heat shield segment 602 and a heat shield retainer 604. The heat shield segment 602 and the heat shield retainer 604 exhibit structural and dimensional characteristics similar to the embodiments described above so are not repeated here. In various embodiments, a supplemental cover 605 is coupled to the heat shield retainer 604 and serves, for example, to provide additional strength or thermal protection to the heat shield assembly 600. In various embodiments, the supplemental cover 605 defines a cover length 607 and the heat shield retainer 604 defines a retainer length 609. In various embodiments, the cover length 607 is equal to a portion of the retainer length 609 or is equal to the entirety of the retainer length 609. In addition, in various embodiments, the supplemental cover 605 may be positioned along any portion or section of the heat shield retainer 604 along the retainer length 609 thereof. Further, in various embodiments, multiples of the supplemental cover 605 (e.g., two or more supplemental covers) may be spaced along the retainer length 609 of the heat shield retainer 604, for example, to provide additional strength or thermal protection of the heat shield assembly 600 at selected portions or locations of the heat shield retainer 604.

Figure 7A:
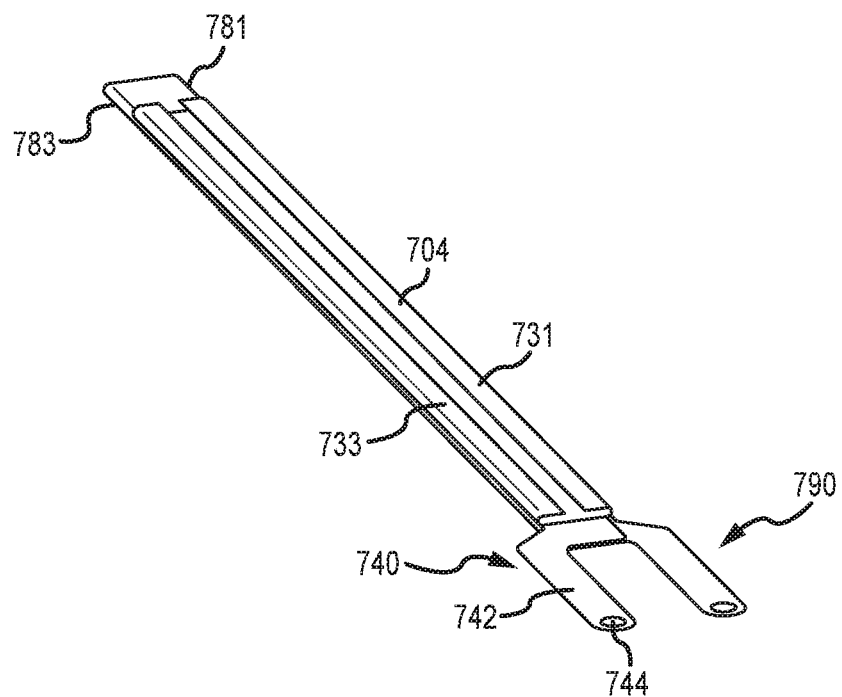
FIGS. 7A, 7B and 7C illustrate a heat shield segment and retainer, in accordance with various embodiments.
Figure 7B:
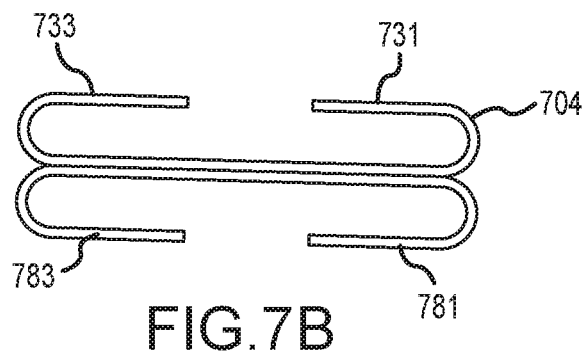
Figure 7C:
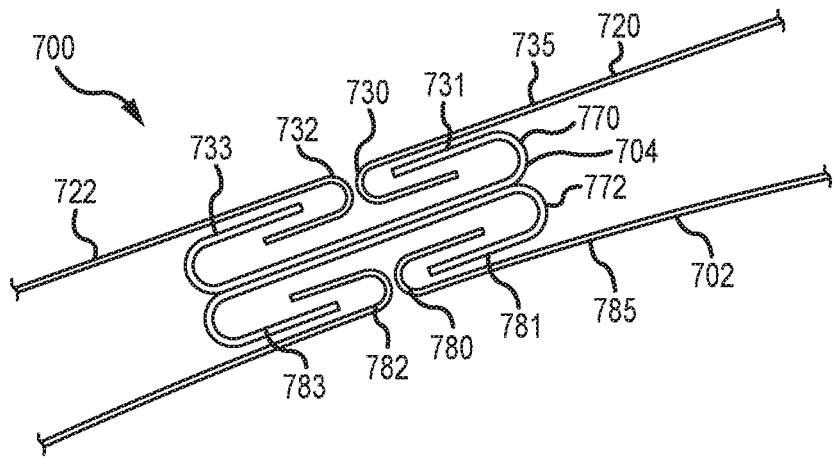

Referring now to FIGS. 7A, 7B and 7C, a heat shield retainer 704 (FIGS. 7A, 7B and 7C) and a heat shield assembly 700 (FIG. 7C) are illustrated, in accordance with various embodiments. The heat shield assembly 700 includes a heat shield segment 702 and the heat shield retainer 704. The heat shield segment 702 includes a first end 720 and a second end 722. The heat shield retainer 704 includes a first half 770 and a second half 772 where, in various embodiments, the first half 770 is disposed radially outward of the second half 772. In various embodiments, the first half 770 and the second half 772 comprise separate components that are attached to one another, e.g., by welding or rivets or the like. In various embodiments, the first half 770 and the second half 772 comprise a unitary or monolithic component. In various embodiments, the first half 770 of the heat shield retainer 704 includes a includes a first clip member 731 and a second clip member 733. The first clip member 731 and the second clip member 733 are configured to engage a first hook member 730 and a second hook member 732, respectively, of a radially outer portion 735 of the heat shield segment 702. Similarly, in various embodiments, the second half 772 of the heat shield retainer 704 includes a includes a first clip member 781 and a second clip member 783. The first clip member 781 and the second clip member 783 are configured to engage a first hook member 780 and a second hook member 782, respectively, of a radially inner portion 785 of the heat shield segment 702. As illustrated, the heat shield retainer 704 may also include a first retainer extension 740 in the form of a tab member 742 having a tab aperture 744 that extends through the tab member 742. As described below, the first retainer extension 740 may function to secure the heat shield retainer 704 to a wheel, such as, for example, the wheel 200 described above with reference to FIG. 2. In various embodiments, the heat shield retainer 704 may include a second retainer extension 790 that shares similar characteristics of the first retainer extension.

Figure 8:
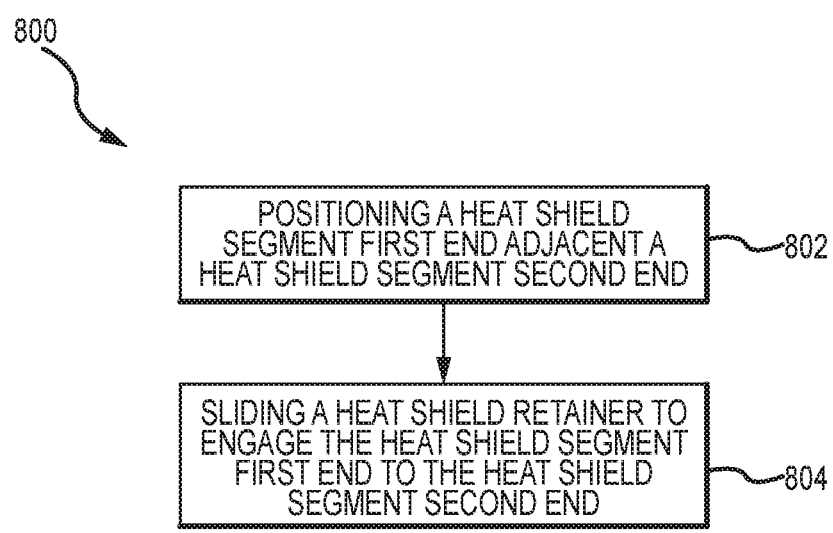
FIG. 8 illustrates a method for assembling a heat shield assembly, in accordance with various embodiments.

Referring to FIG. 8, a method 800 for assembling a heat shield assembly is described. A first step 802 includes positioning a heat shield segment first end adjacent a heat shield segment second end, the heat shield segment first end including a first hook member and the heat shield segment second end including a second hook member. A second step 804 includes sliding a heat shield retainer, including a first clip member configured to engage the first hook member and a second clip member configured to engage the second hook member, along a length of the first hook member and the second hook member to engage the first hook member with the first clip member and the second hook member with the second clip member. In various embodiments, the heat shield assembly comprises either a single-segment heat shield or a multi-segment heat shield.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, it should be understood that any of the above described concepts can be used alone or in combination with any or all of the other above described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed:

1. A heat shield assembly, comprising:
   a first heat shield segment having a first circumferential end and a second circumferential end spaced from the first circumferential end, the first circumferential end including a first hook member and the second circumferential end including a second hook member;
   a first heat shield retainer including a first clip member configured to engage the first hook member and a second clip member,
      wherein the first hook member and the first clip member each comprise a U-shaped profile in a circumferential cross section; and
   a second heat shield retainer configured to engage the first circumferential end of the first heat shield segment, wherein the first heat shield retainer is configured for positioning radially inward of the second heat shield retainer.

2. The heat shield assembly of claim 1, wherein the first hook member extends along at least a first portion of a length between an inboard end and an outboard end of the first heat shield segment.

3. The heat shield assembly of claim 2, wherein the first clip member extends along at least the first portion of the length between the inboard end and the outboard end of the first heat shield segment.

4. The heat shield assembly of claim 3, wherein the second hook member extends along at least a second portion of the length between the inboard end and the outboard end of the first heat shield segment.

5. The heat shield assembly of claim 4, wherein the second clip member extends along at least the second portion of the length between the inboard end and the outboard end of the first heat shield segment.

6. The heat shield assembly of claim 5, wherein the second clip member is configured to engage the second hook member of the first heat shield segment.

7. The heat shield assembly of claim 5, further comprising a second heat shield segment and wherein the second clip member is configured to engage the second heat shield segment.

8. The heat shield assembly of claim 1, wherein the first heat shield retainer is configured for positioning proximate a radially inner surface of the first heat shield segment and the second heat shield retainer is configured for positioning proximate a radially outer surface of the first heat shield segment.

9. The heat shield assembly of claim 8, wherein the second heat shield retainer is configured to engage the second circumferential end of the first heat shield segment.

10. The heat shield assembly of claim 8, further comprising a second heat shield segment and wherein the second heat shield retainer is configured to engage the second heat shield segment.

11. A wheel assembly, comprising:
 a wheel having a wheel well and configured to rotate about an axis;
 a brake mechanism disposed radially inward of the wheel well;
 a heat shield segment having a first circumferential end and a second circumferential end spaced from the first circumferential end, the first circumferential end including a first hook member and the second circumferential end including a second hook member;
 a first heat shield retainer including a first clip member configured to engage the first hook member and a second clip member,
  wherein the first hook member and the first clip member each comprise a U-shaped profile in a circumferential cross section; and
 a second heat shield retainer configured to engage the first circumferential end of the heat shield segment, wherein the first heat shield retainer is configured for positioning radially inward of the second heat shield retainer.

12. The wheel assembly of claim 11, wherein the first hook member extends along a length between an inboard end and an outboard end of the heat shield segment.

13. The wheel assembly of claim 12, wherein the first clip member extends along the length between the inboard end and the outboard end of the heat shield segment.

14. The wheel assembly of claim 11, wherein the second clip member is configured to engage the second hook member of the heat shield segment.

15. The wheel assembly of claim 11, wherein the first heat shield retainer includes a tab member configured for engagement with the wheel.

16. A method for assembling a heat shield assembly, comprising:
 positioning a heat shield segment first circumferential end adjacent a heat shield segment second circumferential end, the heat shield segment first circumferential end including a first hook member and the heat shield segment second circumferential end including a second hook member;
 sliding a first heat shield retainer, including a first clip member configured to engage the first hook member and a second clip member configured to engage the second hook member, along a length of the first hook member and the second hook member to engage the first hook member with the first clip member and the second hook member with the second clip member,
  wherein the first hook member and the first clip member each comprise a U-shaped profile in a circumferential cross section; and
 engaging a second heat shield retainer with the first circumferential end of the heat shield segment, wherein the first heat shield retainer is configured for positioning radially inward of the second heat shield retainer.

17. The method of claim 16, wherein the heat shield assembly comprises either a single-segment heat shield or a multi-segment heat shield.

* * * * *